United States Patent
Chi et al.

(10) Patent No.: US 8,014,473 B2
(45) Date of Patent: Sep. 6, 2011

(54) METHOD AND APPARATUS FOR DETECTING MESSAGES WITH UNKNOWN SIGNALING CHARACTERISTIC

(75) Inventors: Richard Chi, Santa Clara, CA (US); Da-Shan Shiu, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 2283 days.

(21) Appl. No.: 09/834,135

(22) Filed: Apr. 12, 2001

(65) Prior Publication Data

US 2002/0131532 A1    Sep. 19, 2002

Related U.S. Application Data

(60) Provisional application No. 60/264,619, filed on Jan. 26, 2001, provisional application No. 60/265,551, filed on Jan. 31, 2001.

(51) Int. Cl.
*H04L 27/06* (2006.01)
(52) U.S. Cl. .................. 375/341; 375/316; 714/795
(58) Field of Classification Search ............. 375/316, 375/341, 342, 324; 714/795, 792; 455/434
See application file for complete search history.

(56) References Cited

U.S. PATENT DOCUMENTS

| 6,147,964 | A | 11/2000 | Black et al. | |
|---|---|---|---|---|
| 6,917,629 | B1 * | 7/2005 | Ramesh et al. | 370/509 |
| 2001/0040916 | A1 | 11/2001 | Sato | |
| 2002/0108090 | A1 * | 8/2002 | Ariel et al. | 714/792 |

OTHER PUBLICATIONS

Chi, et al., *Rate Determination Algorithms in IS-95 Forward Traffic Channels*; IEEE Vehicular Technology Conference, vol. 3:2187-2191 (1998).
Gutierrez, et al., *A ML Rate Detection Algorithm for IS-95 CDMA*; IEEE Vehicular Technology Conference, vol. 1:417-421 (1999).
International Search Report—PCT/US02/01799, International Search Authority—European Patent Office—Aug. 16, 2002.
International Preliminary Examination Report—PCT/US02/01799, IPEA/US—Sep. 10, 2003.

* cited by examiner

*Primary Examiner* — Temesghen Ghebretinsae
(74) *Attorney, Agent, or Firm* — Abdollah Katbab

(57) ABSTRACT

Techniques for detecting received sequences when certain signaling characteristics (e.g., transport formats, rates) are not known a priori at the receiver. In one method, a sequence for a transmitted message is received, and a metric value is computed for each of a number of hypothesized messages corresponding to a number of hypotheses for the unknown signaling characteristic of the transmitted message. The metric value is computed based on a MAP metric derived to approximately maximize a joint a posteriori probability between the received sequence and the hypothesized messages. The hypothesized message having the best metric value is selected as the transmitted message. The specific form of the MAP metric is dependent on the particular signaling scheme used to map the message to its corresponding sequence, and may be used for blind transport format detection (BTFD) in a W-CDMA system and blind rate detection in an IS-95 CDMA system.

29 Claims, 6 Drawing Sheets

METHOD AND APPARATUS FOR DETECTING MESSAGES WITH UNKNOWN SIGNALING CHARACTERISTIC

CROSS-REFERENCE TO RELATED APPLICATIONS

This application claims the benefit of U.S. Provisional Patent Application Nos. 60/264,619, filed Jan. 26, 2001, and 60/265,551, filed Jan. 31, 2001.

BACKGROUND

1. Field

The present invention relates generally to data communication, and more specifically to techniques for detecting received messages when one or more signaling characteristics of the messages are not known a priori. The techniques may be used for blind transport format detection (BTFD) in a W-CDMA system and blind rate detection in an IS-95 CDMA system.

2. Background

Wireless communication systems are widely deployed to provide various types of communication such as voice, packet data, and so on. These systems may be based on code division multiple access (CDMA), time division multiple access (TDMA), frequency division multiple access (FDMA), or some other multiple access techniques. CDMA systems provide certain advantages over other types of system, including increased system capacity.

For enhanced flexibility and better utilization of the available system capacity, some communication systems transmit data using a signaling scheme that supports a number of different rates or transport formats. For example, in an IS-95 CDMA system, data may be transmitted at one of four possible rates (i.e., full, half, quarter, and eight rates), with the rate being selected for each frame based on the amount of data to be transmitted. In particular, data may be sent using full rate during periods of active speech and eighth rate during periods of silence (i.e., pauses). In a W-CDMA system, data may be transmitted using one of a number of supported transport formats, again depending on the amount of data to be transmitted.

To minimize overhead, no signaling may be sent to indicate the particular rate or transport format being used for a particular frame. In this case, the receiver needs to perform "blind detection" of each received frame to recover the transmitted data. Since each frame is typically received in the presence of noise, the ability to determine which one of the possible rates or transport formats used for the frame may be compromised.

As can be seen, there is a need in the art for techniques to accurately detect received frames in which one or more signaling characteristics (e.g., rate or transport format) of the frames are not known a priori.

SUMMARY

Aspects of the invention provide techniques for detecting received sequences when certain signaling characteristics (e.g., transport formats, rates) of the messages corresponding to the received sequences are not known a priori at the receiver. These techniques may be used for various communication systems in which messages may be transmitted using a signaling scheme that supports one of a number of possible transport formats, rates, or some other parameter. In an aspect, a "MAP metric" is provided to evaluate different hypotheses for a received sequence. The MAP metric aims to maximize the a posteriori probability of a particular message having been sent, including message format and content, based on the received sequence. The specific form of the MAP metric is dependent on the particular signaling scheme used to map a message to its corresponding sequence. The MAP metrics that may be used for blind transport format detection (BTFD) in a W-CDMA system and blind rate detection in an IS-95 CDMA system are described below.

A specific embodiment of the invention provides a method for decoding messages in which at least one signaling characteristic (e.g., transport format, rate) of the messages is not known a priori. In accordance with the method, a sequence for a transmitted message is received, and a metric value is computed for each of a number of hypothesized messages corresponding to the hypotheses for the unknown signaling characteristic of the transmitted message. The metric value is computed based on a metric derived to approximately maximize the joint a posteriori probability between the received sequence and the hypothesized messages. The hypothesized message having the best metric value is then selected as the transmitted message. The metric is typically derived based on the particular signaling scheme used to map the transmitted message to the sequence.

The invention further provides other methods and apparatus (e.g., receiver unit) that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

In accordance with an aspect of the invention, a MAP metric is provided to evaluate different hypotheses for a received sequence. This metric aims to maximize the a posteriori probability of a particular message having been sent, based on the received sequence. The specific form of the MAP metric is dependent on the particular signaling scheme used to map a message to its corresponding sequence. For clarity, the MAP metric is first derived and applied for blind transport format detection (BTFD) in a W-CDMA system, and thereafter derived and applied for blind rate detection in an IS-95 CDMA system.

Blind Transport Format Detection (BTFD) in W-CDMA

Figure 1:
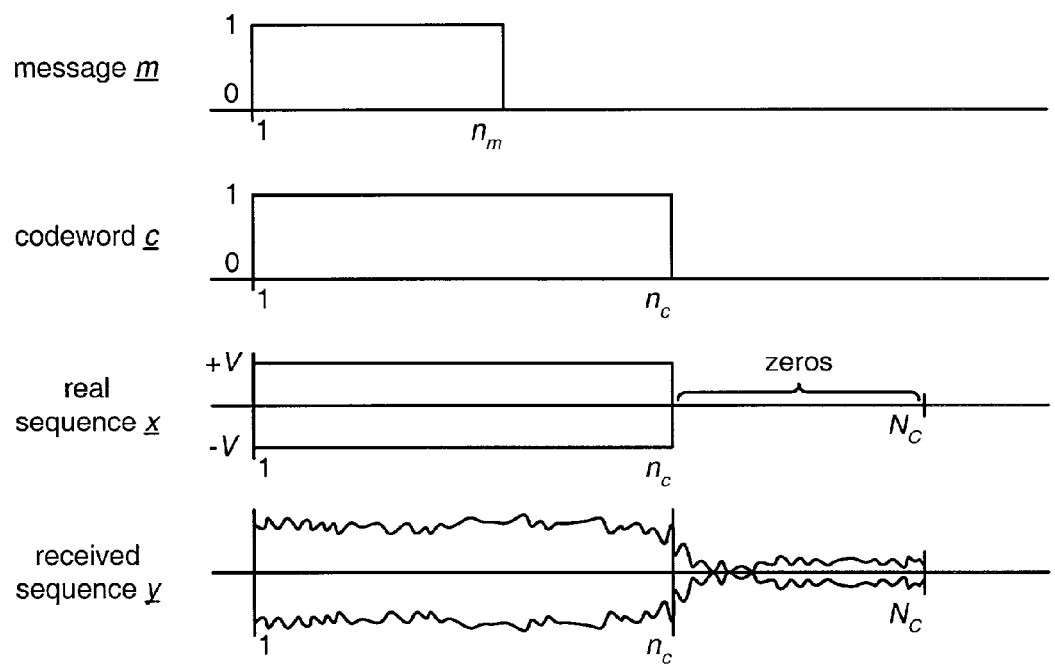
FIG. 1 illustrates a signaling scheme used for the downlink of a W-CDMA system.

FIG. 1 illustrates a signaling scheme used for the downlink of a W-CDMA system. A transmission source generates a message m with binary symbols and having a variable length $n_m$, where $n_m \in \{n_1, n_2, \ldots, n_M\}$, M is the total number of possible message lengths, and $n_M$ is the maximum message length. Each message m includes data to be transmitted from the source and can have any one of M possible lengths.

The message m is then mapped to a codeword c with binary symbols and also having a variable length $n_c$, where $n_c \in \{f(n_1), f(n_2), \ldots, f(n_M)\}$ and $f(\ )$ is some monotonic function on the message length $n_m$. Thus, there is a one-to-one mapping between a particular message m and its corresponding codeword c, and between the particular message length $n_m$ and the corresponding codeword length $n_c$. The function $f(\ )$ may be related to the code rate of the (e.g., convolutional or Turbo) code used to encode the message to generate the corresponding codeword. For simplicity, the maximum codeword length $f(n_M)$, which corresponds to the maximum message length $n_M$, is denoted as $N_C$.

The codeword c is thereafter mapped to a sequence x of real values and having a fixed length $N_C$, as defined by the signaling scheme used in the W-CDMA system. The sequence x can be expressed as:

$$X = [x_1, x_2, \ldots, x_{N_C}],$$

$$x_i \in \{+V, -V\} \text{ for } i \leq n_c, \text{ and}$$

$$x_i = 0 \text{ for } n_c < i \leq N_C \quad \text{Eq (1)}$$

where $+V$ and $-V$ can be any complementary real values. As shown in equation (1), the sequence x includes a real value ($+V$ or $-V$) for each of the $n_c$ binary symbols in the codeword c, and a value of zero (0) otherwise. Moreover, the zeros in the sequence x are appended at the end of the sequence. No signal energy is transmitted over the channel for those symbol positions with a corresponding $x_i$ of zero.

The sequence x is then transmitted over a communication link (e.g., an additive white Gaussian noise (AWGN) channel having noise that is independently and identically distributed with zero mean and a variance of $\sigma^2$ (i.e., $n \sim $ i.i.d. $N(0, \sigma^2)$)). The received sequence y after transmission through the communication channel can be expressed as:

$$y = x + n, \quad \text{Eq (2)}$$

where n is the channel noise. As shown in equation (2) there is a one-to-one mapping between the received sequence y and the corresponding transmitted sequence x, codeword c, and generated message m. However, because of the channel noise n, it is often not obvious which transport format was used for the message m (i.e., the actual length $n_m$ of the message m).

In an aspect, a MAP metric is provided to detect a received sequence y to determine the corresponding transmitted message m. The MAP metric maximizes the joint a posteriori probability, P(m, y), of a particular message m having been sent, based on the received sequence y. The MAP metric can be computed for the received sequence y and each of M hypothesized messages m that may have been generated for the sequence y. The hypothesized message m with the best metric value can then be selected as the transmitted message.

In an embodiment, the MAP metric used to detect the received sequence y may be expressed as:

$$P(m, y) = P(m) P(y|m)$$

$$\ln P(m, y) = \ln P(m) + \ln P(y|m)$$

$$\text{MAP metric }(m, y) = \text{Metric 1} + \text{Metric 2} \quad \text{Eq (3)}$$

The first equality in equation (3) indicates that the joint a posteriori probability, P(m, y), is equal to the probability of the message m being transmitted, P(m), times the probability of receiving the sequence y given that message m was transmitted, P(y|m). Taking the natural log (ln) of this first equality decomposes the MAP metric into a sum of two "sub-metrics" (i.e., Metrics 1 and 2). Each of these sub-metrics is individually derived below.

Metric 2 may be computed as follows:

$$\text{Metric } 2 = \ln P(\underline{y}|\underline{m}) \quad \text{Eq (4)}$$

$$= \ln P(\underline{n} = \underline{y} - \underline{x}|\underline{x})$$

$$= \ln\left[\frac{1}{(2\pi\sigma^2)^{N_C/2}} \exp\left(-\frac{|\underline{y} - \underline{x}|^2}{2\sigma^2}\right)\right]$$

$$= \left[\ln \frac{1}{(2\pi\sigma^2)^{N_C/2}}\right] + \left[\frac{|\underline{y} - \underline{x}|^2}{2\sigma^2}\right]$$

The second equality in equation (4) is a substitution of the probability of the channel noise n being received given the transmitted sequence x. The third equality in equation (4) is based on statistical analysis for an AWGN channel, which is known in the art.

In equation (4), the first additive term in the last equality is a constant that is not dependent on the message m. This term is the same for all hypothesized messages to be evaluated and can thus be ignored. Metric 2 can then be simplified and expressed as:

$$\text{Metric } 2 = -\left[\frac{|\underline{y} - \underline{x}|^2}{2\sigma^2}\right] \quad \text{Eq (5)}$$

$$= -\frac{1}{2\sigma^2} \sum_{i=1}^{N_C} (y_i - x_i)^2 \; y_i \text{ and } x_i \text{ are elements of } \underline{y} \text{ and } \underline{x}$$

$$= -\frac{1}{2\sigma^2}\left[\sum_{i=1}^{n_c}(y_i - x_i)^2 + \sum_{i=n_c+1}^{N_C}(y_i - x_i)^2\right]$$

$$= -\frac{1}{2\sigma^2}\left[\sum_{i=1}^{n_c}(y_i^2 - 2y_i x_i + x_i^2) + \sum_{i=n_c+1}^{N_C} y_i^2\right]$$

$$= -\frac{1}{2\sigma^2}\left[\sum_{i=1}^{n_c}(-2y_i x_i + x_i^2) + \sum_{i=1}^{N_C} y_i^2\right]$$

The third equality in equation (5) decomposes the summation over two segments, with the first segment covering 1 through $n_c$ and the second segment covering $n_c+1$ to $N_C$, where $n_c$ is the length of the codeword c corresponding to the particular hypothesized message m being evaluated. As shown in equation (1), since $x_i = 0$ for $n_c < i \leq N_C$, the second summation in the third equality simplifies to the second summation shown in the fourth equality. The terms for the fifth equality are derived by simply rearranging and combining terms from the fourth equality.

In equation (5), the second additive term in the last equality is a summation of the received sequence power over the maximum message length, $N_C$, and is not dependent on the hypothesized message m. Again, since this term is the same for all hypothesized messages to be evaluated, it can be ignored. Thus, Metric 2 can be further simplified and expressed as:

$$\text{Metric } 2 = -\frac{1}{2\sigma^2}\sum_{i=1}^{n_c}(-2y_i x_i + x_i^2) \qquad \text{Eq (6)}$$

$$= -\frac{1}{2\sigma^2}\left(\sum_{i=1}^{n_c} -2y_i x_i + \sum_{i=1}^{n_c} V^2\right)$$

$$= \left(\frac{1}{\sigma^2}\sum_{i=1}^{n_c} x_i y_i\right) - \left(\frac{n_c V^2}{2\sigma^2}\right)$$

In equation (6), it can be noted that the first term in the last equality is proportional to an energy metric from a Viterbi decoder for a codeword length $n_c$, and the second term is proportional to the codeword length $n_c$.

Metric 1 in equation (3), which is the natural log of the source probability of the message m, can be expressed as:

Metric 1 = ln $P(m)$.

For simplicity, it is assumed that the length $n_m$ of the transmitted message m is selected from the set $\{n_1, n_2, \ldots, n_m\}$ with equal probability (i.e., $P(n_m)=1/M$), and that each bit within the transmitted message in is selected with equal probability (i.e., $P(m_i)=\frac{1}{2}$ for $1 \leq i \leq n_m$). In this case, the probability of the specific message m being transmitted, P(m), can be expressed as:

$$P(m) = \frac{1}{M} \cdot \frac{1}{2^{n_m}}. \qquad \text{Eq (7)}$$

This assumption on the source probability distribution is made for simplicity, but can be refined if additional information is known for the specific application for which the MAP metric is used (e.g., when performing BTFD on adaptive multi-rate (AMR) frames). However, for generality, no knowledge of the application is assumed.

Metric 1 can then be expressed as:

Metric 1 = $-\ln(M) - n_m \ln(2)$. Eq (8)

Since the first term in equation (8) is a constant and not dependent on the message m, it can be ignored. Metric 1 can then be simplified and expressed as:

Metric 1 = $-n_m \ln(2)$. Eq (9)

The complete MAP metric in equation (3) can then be expressed based on Metrics 1 and 2 derived in equations (6) and (9). Ignoring the additive constants, the complete MAP metric can be expressed as:

$$\text{MAP metric }(\underline{m}, \underline{y}) = \left(\frac{1}{\sigma^2}\sum_{i=1}^{n_c} x_i y_i\right) - \left(\frac{n_c V^2}{2\sigma^2}\right) - n_m \ln(2). \qquad \text{Eq (10)}$$

For each received sequence y, the MAP metric may be computed for each hypothesized transport format for the transmitted message m (i.e., one computation for each of the M hypothesized messages m corresponding to M possible message lengths). The hypothesized message m with the largest value for the MAP metric is then selected as the transmitted message.

Detecting a message m with the MAP metric given in equation (10) maximizes the a posteriori probability of receiving the sequence y, assuming an equal probable distribution over message lengths and symbols in the source. For a source that generates messages m of one particular known length, the second and third terms in equation (10) can be ignored, and the MAP metric reduces to a Viterbi decoder metric, which is known to maximize the a posteriori probability for codewords of the same length. Thus, the MAP metric expressed in equation (10) is a generalization of the Viterbi decoder metric, and may be used for codewords having unequal lengths and based on the specific signaling scheme shown in equation (1) and FIG. 1. As shown in FIG. 1, for this signaling scheme, a transmitted sequence x of fixed length $N_C$ is generated based on a codeword c of variable length $n_c$ followed by (i.e., padded with) ($N_C - n_c$) zeros.

Figure 2A:
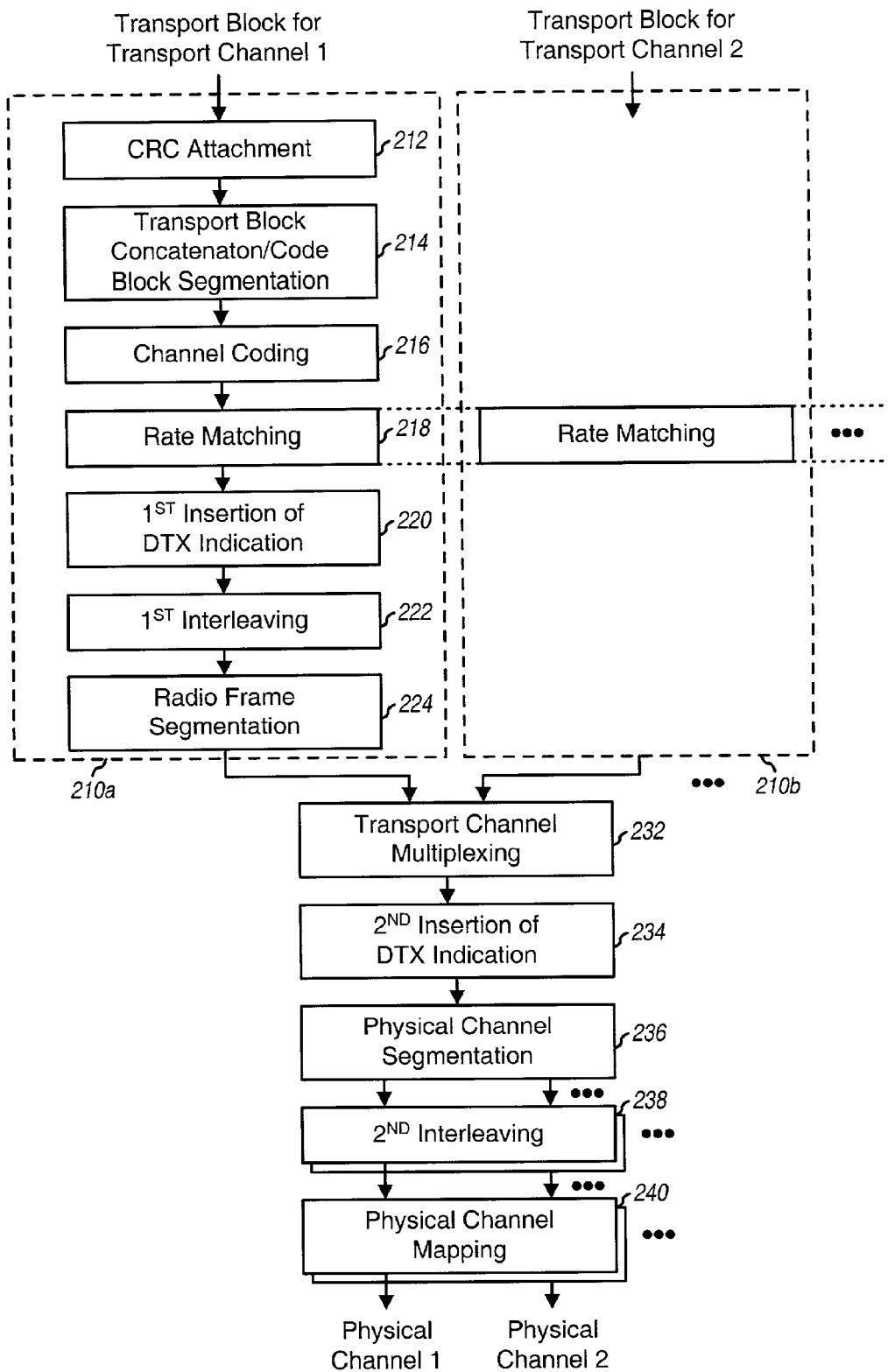
FIGS. 2A and 2B are diagrams of the signal processing at a base station and a user terminal, respectively, for a downlink data transmission in accordance with the W-CDMA standard.

FIG. 2A is a diagram of the signal processing at a base station for a downlink data transmission, in accordance with the W-CDMA standard. The upper signaling layers of a W-CDMA system support concurrent transmission of a number of "transport" channels, with each transport channel capable of carrying data for a particular communication (e.g., voice, video, data, and so on). The data for each transport channel is provided, in blocks that are also referred to as transport blocks, to a respective transport channel processing section 210.

Within transport channel processing section 210, each transport block is used to calculate cyclic redundancy check (CRC) bits, in block 212. The CRC bits are attached to the transport block and used at the user terminal for error detection. A number of CRC coded blocks are then serially concatenated together, in block 214. If the total number of bits after concatenation is greater than the maximum size of a code block, the bits are segmented into a number of (equal-sized) code blocks. Each code block is then coded with a particular coding scheme (e.g., a convolutional code, a Turbo code) or not coded at all, in block 216, to generate coded bits.

Rate matching is then performed on the coded bits in accordance with a rate-matching attribute assigned by higher signaling layers, in block 218. On the uplink, bits are repeated or punctured (i.e., deleted) such that the number of bits to be transmitted matches the number of available bit positions. On the downlink, unused bit positions are filled with discontinuous transmission (DTX) bits, in block 220. The DTX bits indicate when a transmission should be turned off and are not actually transmitted.

The bits are then interleaved in accordance with a particular interleaving scheme to provide time diversity, in block 222. In accordance with the W-CDMA standard, the time interval over which interleaving is performed can be selected from a set of possible time intervals (i.e., 10 msec, 20 msec, 40 msec, or 80 msec). When the selected interleaving interval is longer than 10 msec, the bits within the interval are segmented and mapped onto consecutive transport channel radio frames, in block 224. Each transport channel radio frame corresponds to a transmission over a (10 msec) radio frame period.

The radio frames from all active transport channel processing sections 210 are then serially multiplexed into a coded composite transport channel (CCTrCH), in block 232. DTX bits may then be inserted to the multiplexed radio frames such that the number of bits to be transmitted matches the number of available bit positions on the "physical" channel(s) used for the data transmission, in block 234. If more than one physical channel is used, the bits are segmented among the physical channels, in block 236. The bits in each radio frame period for each physical channel are then interleaved to provide additional time diversity, at block 238. The interleaved physical channel radio frames are then mapped to their respective physical channels, at block 240. Each physical channel may be used to transmit data of a particular type. The subsequent signal processing to generate a modulated signal suitable for transmission to the user terminal is known in the art and not described herein.

Figure 2B:
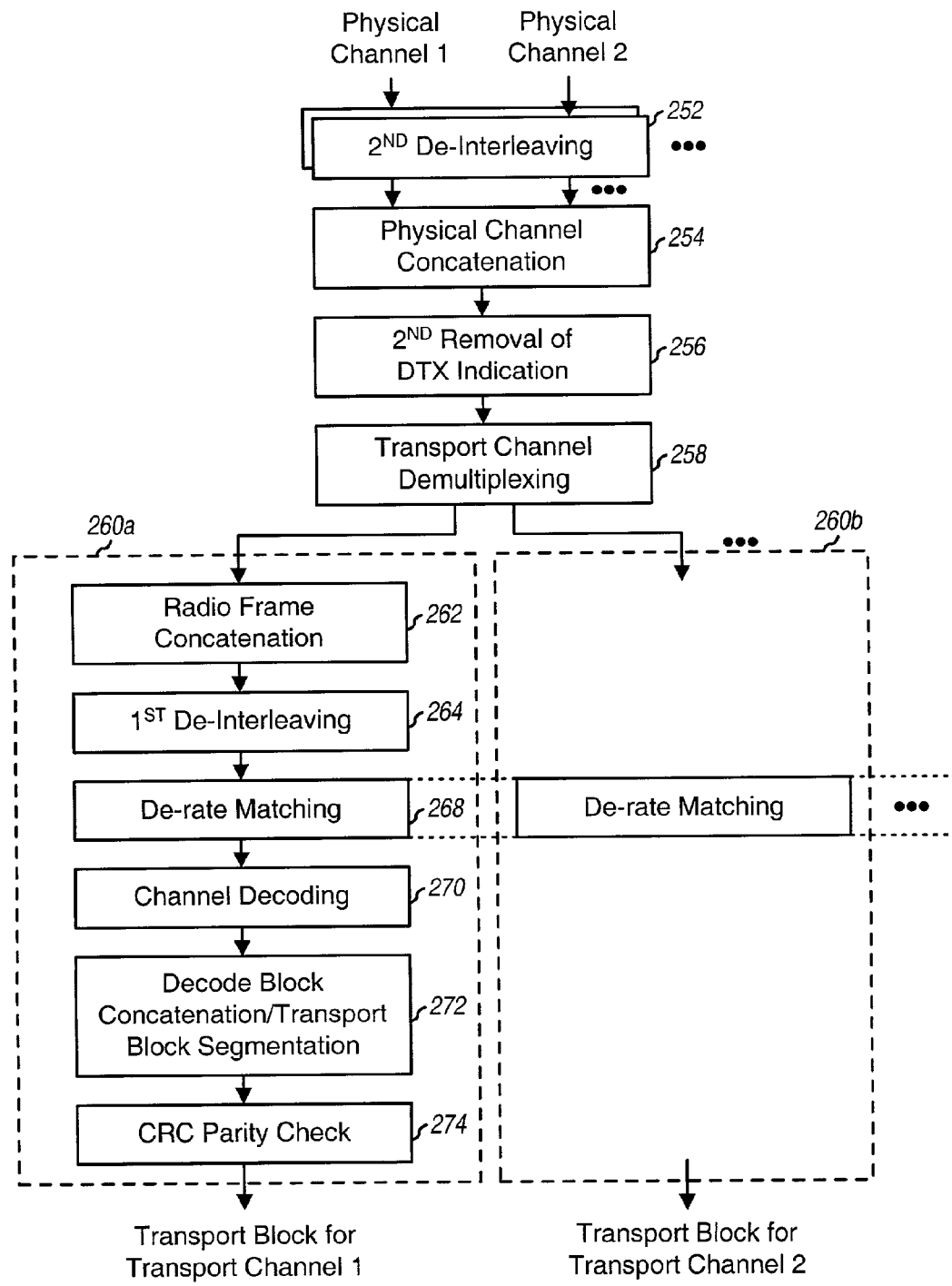

FIG. 2B is a diagram of the signal processing at a user terminal for a downlink data transmission, in accordance with the W-CDMA standard. The signal processing shown in FIG. 2B is complementary to that shown in FIG. 2A. Initially, the modulated signal is received, conditioned, digitized, and processed to provide symbols for each physical channel used for the data transmission. Each symbol has a particular resolution (e.g., 4-bit) and corresponds to a transmitted bit. The symbols in each radio frame period for each physical channel are de-interleaved, in block 252, and the de-interleaved symbols from all physical channels are concatenated, in block 254. The symbols from the first DTX insertion form the padding bits that make the received sequence y a fixed length $N_C$. The symbols are then demultiplexed into various transport channels, in block 258. The radio frames for each transport channel are then provided to a respective transport channel processing section 260.

Within transport channel processing section 260, the transport channel radio frames are concatenated into "traffics", in block 262. Each traffic includes one or more transport channel radio frames and corresponds to the selected interleaving interval used at the transmitter unit. The symbols within each traffic are de-interleaved, in block 264, and non-transmitted symbols are removed, in block 266. Inverse rate matching (or de-rate matching) is then performed to accumulate repeated symbols and insert "erasures" for punctured symbols, in block 268. Each coded block in the traffic is then decoded, in block 270, and the decoded blocks are concatenated and segmented into their respective transport blocks, in block 272. Each transport block is then checked for error using the CRC bits, in block 274.

Figure 3:
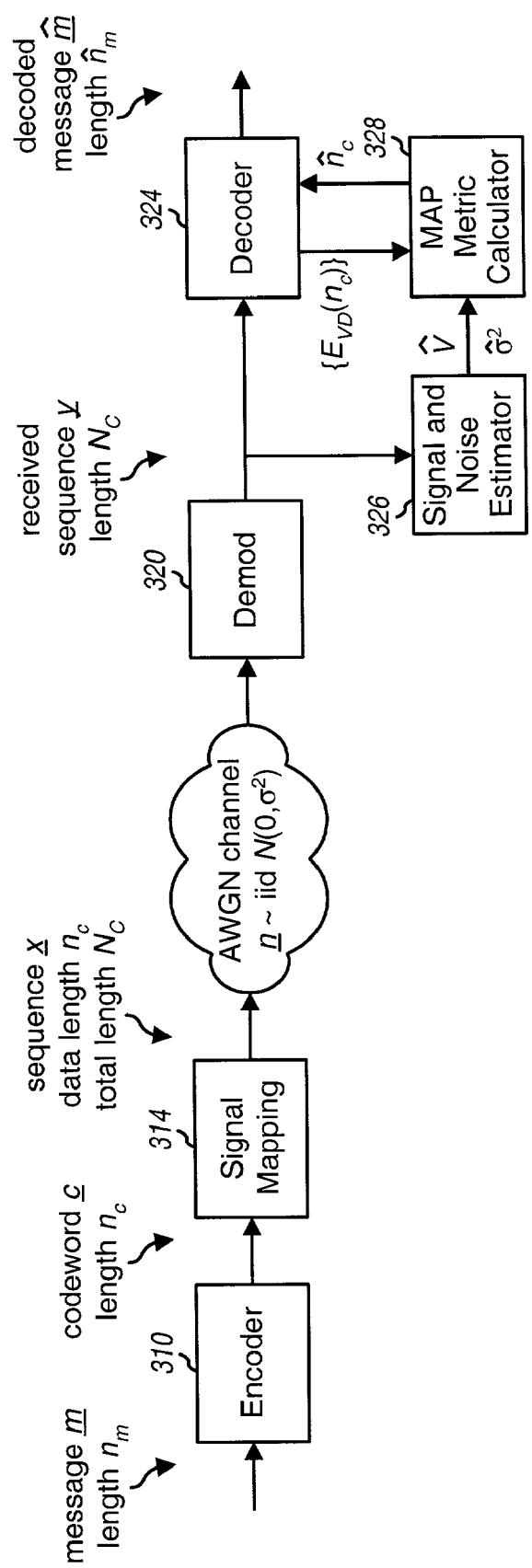
FIG. 3 is a diagram of the processing of a message at a transmitter and the detection of a received sequence at the receiver to recover the transmitted message, in accordance with an embodiment of the invention.

FIG. 3 is a diagram that symbolically illustrates the processing and transmission of a message m from a transmitter (e.g., a base station) to a receiver (e.g., a user terminal), and the detection of a received sequence y at the receiver to recover the transmitted message m, in accordance with an embodiment of the invention. Some of the signal processing (e.g., interleaving, rate-matching, segmentation, multiplexing, and so on) in FIGS. 2A and 2B are omitted in FIG. 3 for simplicity.

A source message m of length $n_m$ (i.e., the transport channel information bits) is received by an encoder 310, which (1) appends a CRC of a specified length to the source message m, (2) appends (zero-valued) tail bits to the message m and CRC to generate a formatted message, (3) encodes the formatted message using a specified convolutional code and code rate, and (4) repeats or punctures zero or more of the coded bits based on specified rate-matching parameters to generate a rate-matched codeword c having a length of $n_c$. The mapping from the source message m to the codeword c is determined by the specific physical channel format selected for that message from among the possible formats supported by the W-CDMA system. Encoder 310 symbolically performs the processing done by section 210 in FIG. 2A.

The codeword c is then mapped by a signal mapping element 314 to a real sequence x using the mapping in equation (1). Signal mapping element 314 symbolically performs the processing shown in blocks 232 through 240 in FIG. 2A, including the second insertion of DTX indications that effectively inserts ($N_C$-$n_c$) zeros in the sequence x. The sequence x has a data length of $n_c$ (for the $n_c$ coded bits in the corresponding codeword c) and a total length of $N_C$ (corresponding to the size of the physical channel frames used for transmitting the message m). The sequence x is then transmitted over an AWGN channel (with n~i.i.d. $N(0,\sigma^2)$) to a user terminal. For the W-CDMA system, a pilot is transmitted along with the sequence x and used by the receiver to perform coherent demodulation and channel estimation.

At the user terminal, the received pilot and data symbols are demodulated by a demodulator 320 to provide a received sequence y having a length of $N_C$. The received sequence y of $N_C$ "soft" symbols is then provided to a decoder 324 and a signal and noise estimator 326.

Decoder 324 performs the processing complementary to that performed by encoder 310 (i.e., de-rate matching, convolutional decoding, and CRC check). Decoder 324 performs the de-rate matching on the received sequence y complementary to the rate matching performed by encoder 310 and provides a sequence of symbols for convolutional decoding. In particular, for de-rate matching, decoder 324 inserts erasures for punctured coded bits and accumulates repeated coded bits. The convolutional decoding may be performed with a Viterbi decoder that attempts to decode the received sequence y based on a number of hypotheses for the length $n_c$ (i.e., M hypotheses corresponding to M possible lengths for the transmitted message m). For each hypothesis, decoder 324 provides a Viterbi decoder metric, which may be expressed shown below in equation (14). Decoder 324 further receives a control signal from MAP metric calculator 328 (e.g., $\hat{n}_c$) indicating which one of the M hypotheses is the best. Decoder 324 then provides the decoded message $\hat{m}$ corresponding to the best hypothesis.

Signal and noise estimator 326 estimates the signal magnitude, V, and the noise variance, $\sigma^2$, of the received sequence y. Estimator 326 then provides these estimates to MAP metric calculator 328, which uses these estimates to derive the MAP metric for each hypothesis. The estimates for V and $\sigma^2$ may be derived as described below.

The variables in the MAP metric shown in equation (10) (replicated below) are related to parameters in the W-CDMA system in the following manner:

$$\text{MAP metric } (\underline{m}, \underline{y}) = \left( \frac{1}{\sigma^2} \sum_{i=1}^{n_c} x_i y_i \right) - \left( \frac{n_c V^2}{2\sigma^2} \right) - n_m \ln(2)$$

where $n_c$ is the number of bits in codeword c (after the rate matching at the transmitter) for the transport format hypothesis m being evaluated;

$x_i$ is the sequence resulting from the mapping of the codeword c of bits (after rate matching) to real values {+V, −V, 0} based on equation (3), and is also the sequence of soft symbols that would be provided to decoder 324 in the absence of noise (i.e., n=0);

$y_i$ is the sequence of received soft symbols provided to decoder 324; and $n_m$ is the length of the transport format being evaluated.

At the receiver, the values of the parameters V and $\sigma^2$ are estimated since these are random parameters. These parameters may be estimated based on information derived from a forward power control (FPC) mechanism, which adjusts the transmit power of a downlink data transmission such that it is received at a target signal-to-noise-plus interference ratio (SNR) (i.e., the setpoint) needed to achieve a particular level of performance.

Figure 4:
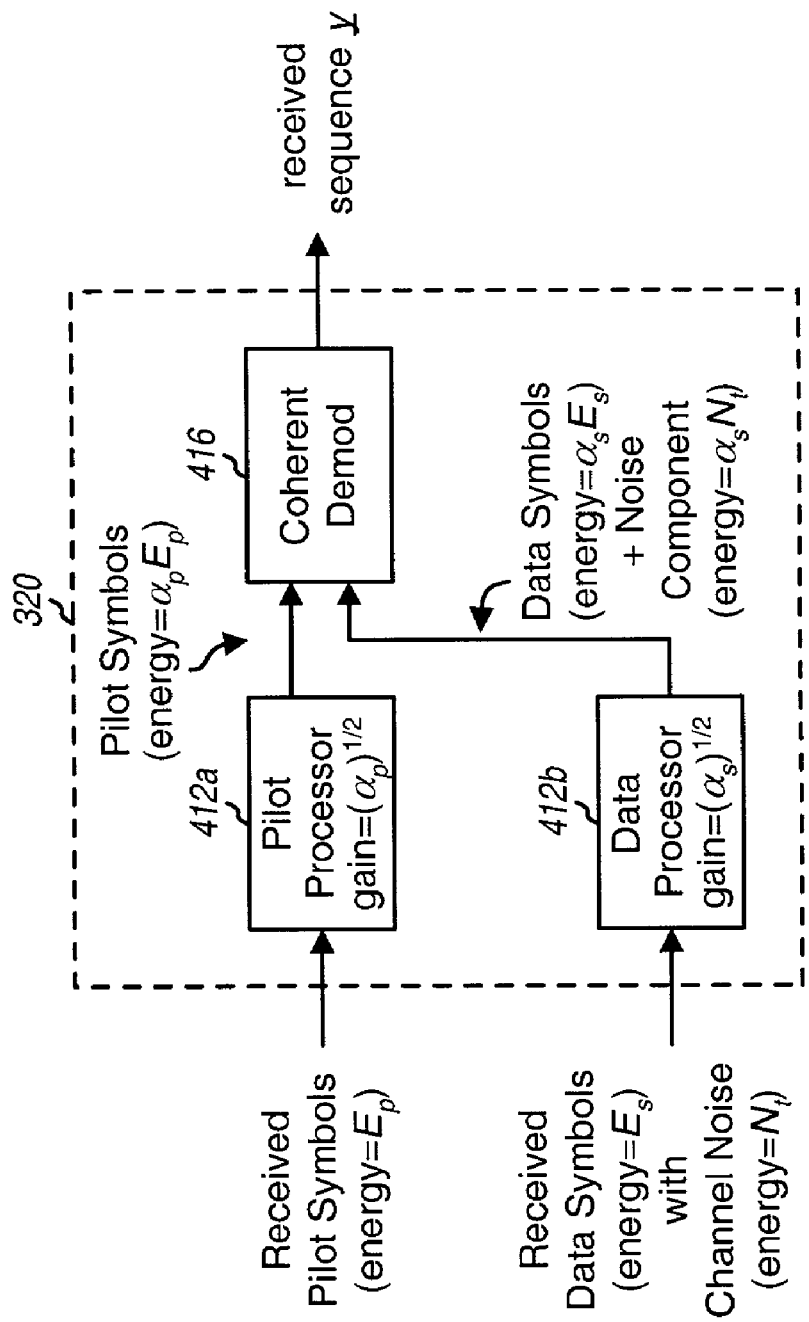
FIG. 4 is a block diagram of an embodiment of demodulator, which may be used to demodulate received data symbols with pilot to provide the received sequence.

FIG. 4 is a block diagram of an embodiment of demodulator 320, which may be used to demodulate the received data symbols with the pilot to provide the received sequence y. On the downlink in the W-CDMA system, a pilot is transmitted along with data to assist the receiver to demodulate the transmitted signal. The received pilot symbols (which has an energy of $E_p$) are provided to a pilot processor 412a within demodulator 320, and the received data symbols (which has an energy of $E_s$) plus channel noise (which has a variance of $N_t$ per symbol) are provided to a data processor 412b. Each processor 412 processes the respective received symbols to provide processed symbols. The processing may include, for example, automatic gain control (AGC), scaling, filtering, and so on. The effective gain applied to the received pilot symbols may be expressed as $(\alpha_p)^{1/2}$ and the effective gain applied to the received data symbols may be expressed $(\alpha_s)^{1/2}$.

A coherent demodulator 416 then receives and coherently demodulates the processed data symbols with the processed pilot symbols to provide the received sequence y. Coherent demodulation is known in the art and not described herein. Decoder 324 also receives the sequence y and provides hypothesized codewords c corresponding to different transport formats hypothesized for the transmitted message m. Decoder 324 also performs the complementary function of signal mapping element 314 in FIG. 3 and removes $(N_C - n_c)$ zeros from the received sequence y to provide the codeword c. Signal and noise estimator 326 also receives the sequence y and provides estimates of the parameters V and $\sigma^2$.

In an embodiment, the estimate of V ($\hat{V}$) and the estimate of $\sigma^2$ ($\hat{\sigma}^2$) may be expressed as:

$$\hat{V} = \sqrt{\alpha_s \hat{E}_s} \sqrt{\alpha_p \hat{E}_p}, \text{ and} \quad \text{Eq (11)}$$

$$\hat{\sigma}^2 = \alpha_s \hat{N}_t \alpha_p \hat{E}_p, \quad \text{Eq (12)}$$

where $\alpha_s \hat{E}_s$ is the estimated energy of the signal component per symbol provided to decoder 324;

$\alpha_p \hat{E}_p$ is the estimated energy of the pilot component per symbol provided to decoder 324; and $\alpha_s \hat{N}_t$ is the estimated noise variance per symbol provided to decoder 324.

The scaling factors $\alpha_s$ and $\alpha_p$ in equations (11) and (12) are introduced to allow the definitions of $E_s$, $E_p$, and $N_t$ to be consistent with normal convention (i.e., signal energy per symbol $E_s$, pilot energy per symbol $E_p$, and noise variance per symbol $N_t$, all of which referred to the input of the receiver). It should be noted that the formulation shown in equations (11) and (12) does not necessarily require explicit knowledge of the scaling factors $\alpha_s$ and $\alpha_p$ applied to the data symbols, noise, and pilot. Rather, only estimates of the components $\alpha_s E_p$, $\alpha_p E_p$, and $\alpha_s N_t$ of the received sequence y at the input to decoder 324 (which already incorporate the $\alpha_s$ and $\alpha_p$ scaling factors) are required.

One possible implementation of noise and signal estimator 326 is as follows. The estimate of V can be derived by averaging the received sequence y over a particular time interval (to remove the noise component which has zero mean). The estimate of $\sigma^2$ can be derived by averaging the variation in the energy of the received sequence y.

Using the estimates for V and $\sigma^2$ shown in equations (11) and (12), the MAP metric shown in equation (10) may then be expressed as:

$$\text{MAP metric}(\underline{m}, \underline{y}) = \left(\frac{1}{\sigma^2}\sum_{i=1}^{n_c} x_i y_i\right) - \left(\frac{n_c V^2}{2\sigma^2}\right) - n_m \ln(2) \quad \text{Eq (13)}$$

$$= \left(\frac{1}{\sigma^2}\sum_{i=1}^{n_c}(\pm 1)_i V y_i\right) - \left(\frac{n_c V^2}{2\sigma^2}\right) - n_m \ln(2)$$

$$\approx \left(\frac{1}{\hat{\sigma}^2}\sum_{i=1}^{n_c}(\pm 1)_i \hat{V} \frac{y_i'}{\beta}\right) - \left(\frac{n_c \hat{V}^2}{2\hat{\sigma}^2}\right) - n_m \ln(2)$$

$$\approx \left(\frac{\hat{V}}{\beta \hat{\sigma}^2}\sum_{i=1}^{n_c}(\pm 1)_i y_i'\right) - \left(\frac{n_c \hat{V}^2}{2\hat{\sigma}^2}\right) - n_m \ln(2)$$

$$\approx \frac{\left(\sqrt{\alpha_s \hat{E}_s \alpha_p \hat{E}_p}\right)}{\beta(\alpha_s \hat{N}_t \alpha_p \hat{E}_p)} E_{VD}(n_c) -$$

$$\frac{n_c \left(\sqrt{\alpha_s \hat{E}_s \alpha_p \hat{E}_p}\right)^2}{2 \alpha_s \hat{N}_t \alpha_p \hat{E}_p} - n_m \ln(2)$$

where $\beta$ is a scaling factor used for the symbols received by the Viterbi decoder prior to decoding and $E_{VD}(n_c)$ is the energy computed by the Viterbi decoder for a hypothesized codeword of length $n_c$. The Viterbi decoder energy, $E_{VD}(n_c)$, can be expressed as:

$$E_{VD}(n_c) = \sum_{i=1}^{n_c}(\pm 1)_i y_i', \quad \text{Eq (14)}$$

where $(\pm 1)_i$ is the sequence of coded bits (i.e., codeword) corresponding to the most likely estimate of the decoded message for a particular format hypothesis.

Decoder 324 is provided with the scaled rate-matched sequence y' and performs the de-rate matching and convolutional decoding (the rate-matching (i.e., repetition or puncturing) can be view as another code. Decoder 324 also receives an indication of the hypothesized format being evaluated. The Viterbi decoder within decoder 324 then decodes the sequence y based on the hypothesized format and provides a decoded message m that is the most likely to have been transmitted for that hypothesized format (i.e., the maximum likelihood sequence). Decoder 324 also provides the Viterbi decoder energy, $E_{VD}(n_c)$, for each hypothesized format, which may be derived by (1) re-encoding the decoded sequence m to generate a re-encoded sequence $(\pm 1)_i$ of coded bits for that hypothesized format, and (2) correlating the re-encoded sequence $(\pm 1)_i$ with the received sequence y over the hypothesized length $n_c$. However, the Viterbi decoder energy, $E_{VD}(n_c)$, may also be derived as a by-product of the Viterbi decoding process and needs not be computed by re-encoding the decoded message m.

As shown in equations (10) and (13), the MAP metric for each hypothesized transport format (i.e., message m of length $n_m$ and corresponding codeword c of length $n_c$) is dependent on a number of variables including (1) the Viterbi decoder energy $E_{VD}(n_c)$, (2) the signal estimate $\hat{V}$, (2) the noise variance estimate $\hat{\sigma}^2$, and (4) the hypothesized message and codeword lengths $n_m$ and $n_c$. These terms (except for the noise variance) are dependent on the particular transport format hypothesis being evaluated. However, for simplicity, various variables in equation (10) may be approximated, and this is within the scope of the invention. For example, the maximum signal estimate $\hat{V}$ may be used for all hypothesized transport formats.

Equation (10) represents a generalized form of the MAP metric for the signaling scheme shown in equation (1) and FIG. 1. This MAP metric may be used for the W-CDMA system. FIGS. 3 and 4 also show a specific implementation that uses the MAP metric to perform blind transport format detection in the W-CDMA system. Other implementations may also be contemplated and are within the scope of the invention.

Blind Rate Detection in IS-95 CDMA

Figure 5:
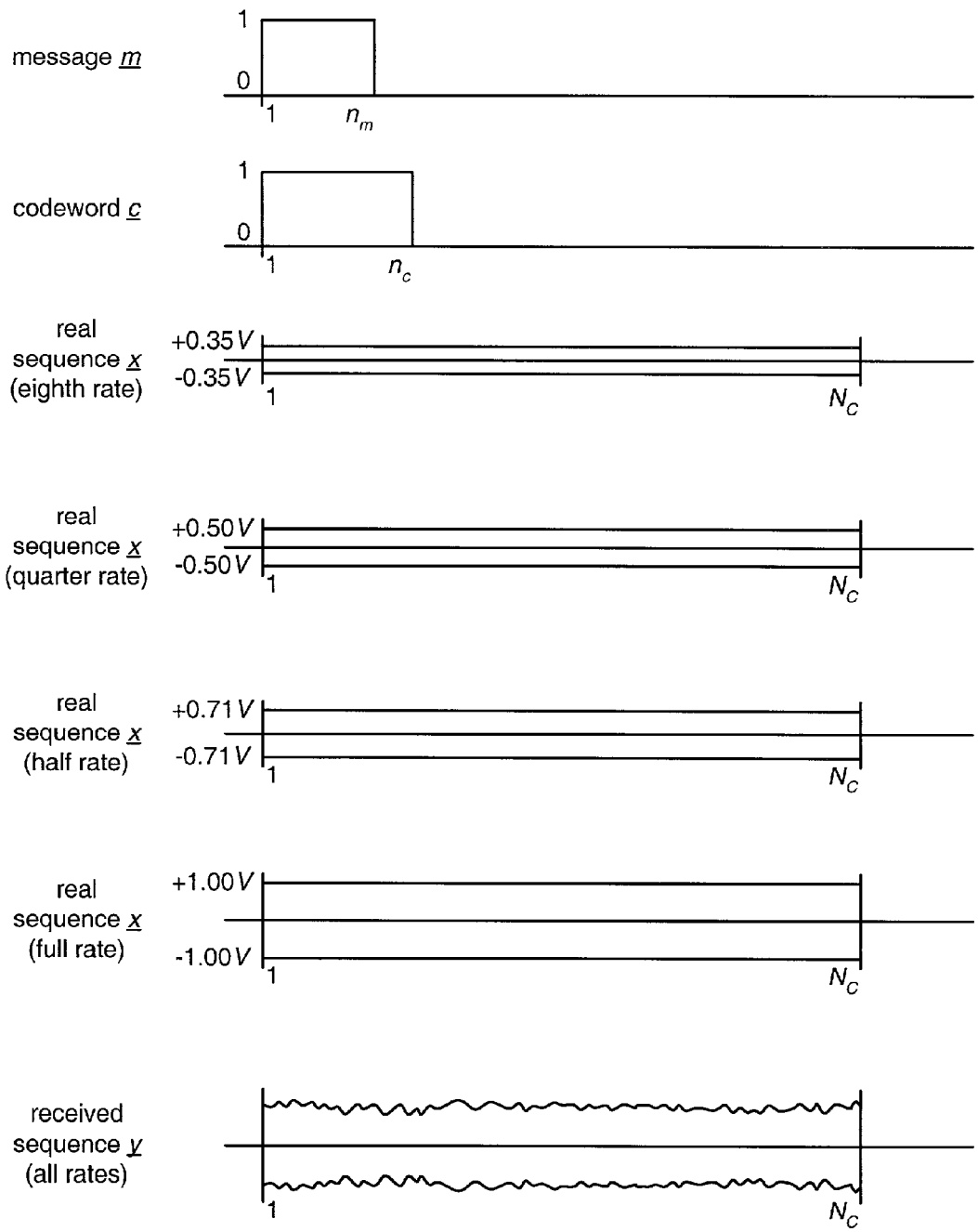
FIG. 5 illustrates a signaling scheme defined by the IS-95 CDMA standard

FIG. 5 illustrates a signaling scheme defined by the IS-95 CDMA standard. A transmission source generates a message m with binary symbols and having a variable length $n_m$, where $n_m \in \{n_1, n_2, \ldots, n_M\}$, M is the total number of possible message lengths, and $n_M$ is the maximum message length. Associated with each message is a rate parameter R, which can take on a value of 1, ½, ¼, or ⅛.

The message m is then mapped to a codeword c with binary symbols and having a fixed length $N_C$. The codeword c is thereafter mapped to a sequence x of real values and also having a fixed length $N_C$ such that:

$$x = [x_1, x_2, \ldots, x_{N_C}], \text{ and}$$

$$x_i \in \{+\sqrt{RV}, -\sqrt{RV}\}, \quad \text{Eq (15)}$$

where R is the rate parameter and V is a real value. As shown in equation (15), the sequence x includes a real value for each of the $N_C$ binary symbols in the codeword c, with the real value being scaled by the square root of the rate R. At lower rates (i.e., ½, ¼, and ⅛) each symbol in the codeword c is sent 1/R times, and the scaling by $\sqrt{R}$ is used to achieve approximately similar energy per symbol at the receiver after accumulation of the (1/R) repeated symbols.

The sequence x is then sent over an AWGN channel having n~i.i.d. $N(0,\sigma^2)$. The received sequence after transmission through the communication channel can be expressed as:

$$y = x + n.$$

A MAP metric is provided to detect a received sequence y to determine the corresponding transmitted message m. The MAP metric maximizes the joint a posteriori probability, P(m, y), of a particular message m having been sent, based on the received sequence y. The MAP metric may be expressed as shown in equation (3) and may be decomposed into Metrics 1 and 2.

Metric 2 may be computed as shown in equation (4). In equation (4), the first additive term in the last equality is a constant that is not dependent on the message m. This term can thus be ignored. Metric 2 can then be simplified and expressed as:

$$\text{Metric 2} = \left[\frac{|y-x|^2}{2\sigma^2}\right]$$

$$= -\frac{1}{2\sigma^2} \sum_{i=1}^{N_C} (y_i - x_i)^2 \quad y_i \text{ and } x_i \text{ are elements of } \underline{y} \text{ and } \underline{x}$$

$$= -\frac{1}{2\sigma^2} \left[\sum_{i=1}^{N_C} (y_i^2 - 2y_i x_i + x_i^2)\right]$$

$$= -\frac{1}{2\sigma^2} \sum_{i=1}^{N_C} y_i^2 - \frac{1}{2\sigma^2} \sum_{i=1}^{N_C} (-2y_i x_i + x_i^2)$$

Eq (16)

In equation (16), the first additive term in the last equality is not dependent on the message m and can be ignored. Thus, Metric 2 can be further simplified and expressed as:

$$\text{Metric 2} = -\frac{1}{2\sigma^2} \sum_{i=1}^{N_C} (-2y_i x_i + x_i^2) \quad \text{Eq (17)}$$

$$= -\frac{1}{2\sigma^2} \left(\sum_{i=1}^{N_C} -2y_i x_i + \sum_{i=1}^{N_C} RV^2\right)$$

$$= \left(\frac{1}{\sigma^2} \sum_{i=1}^{N_C} x_i y_i\right) - \left(\frac{N_C RV^2}{2\sigma^2}\right)$$

In equation (17), it can be noted that the first term in the last equality is proportional to the energy metric from the Viterbi decoder. This term will be different for different hypothesized rates R since the coding types (when repetition is considered as a form of coding) across the hypotheses are different. The second term is proportional to the rate R.

Metric 1, which is the natural log of the source probability of the message m, can be expressed as shown in equation (3). For simplicity, it is assumed that the length $n_m$ of the transmitted message m is selected from the set $\{n_1, n_2, \ldots, n_M\}$ with equal probability (i.e., $P(n_m) = 1/M$), and that each bit within the transmitted message m is selected with equal probability (i.e., $P(m_i) = ½$ for $1 \leq i \leq n_m$). In this case, the probability of the specific message m being transmitted, P(m), can be expressed as shown in equation (7). This assumption on the source probability distribution can be refined if additional information is known for the specific application for which the MAP metric is used. However, for generality, no knowledge of the application is assumed.

Metric 1 can then be expressed as shown in equation (8) and can be simplified as shown in equation (9) since the term ln(M) is a constant and not dependent on the message m.

The complete MAP metric in equation (3) for blind rate detection can then be expressed based on Metrics 1 and 2 derived in equations (17) and (9). Ignoring the additive constants, the complete MAP metric can be expressed as:

$$\text{MAP metric}(\underline{m}, \underline{y}) = \left(\frac{1}{\sigma^2} \sum_{i=1}^{N_C} x_i y_i\right) - \left(\frac{N_C RV^2}{2\sigma^2}\right) - n_m \ln(2). \quad \text{Eq (18)}$$

For each received sequence y, the MAP metric may be computed for each hypothesized rate for the transmitted message m (i.e., one computation for each of the four possible rates). The hypothesized message m with the largest value for the MAP metric is then selected as the transmitted message. Detecting a message m with the MAP metric given in equation (18) maximizes the a posteriori probability of receiving the signal y, assuming an equal probable distribution over the possible rates R and symbols in the source.

To implement the MAP metric shown in equation (21) for blind rate detection, the first term may be determined as described above by the Viterbi decoder. The second term is dependent on the hypothesized rate R, the signal amplitude V corresponding to the full rate frame, and the noise variance $\sigma^2$. The signal amplitude V and the noise variance $\sigma^2$ may be estimated similar to that described above.

The elements of the receiver, such as those shown in FIGS. 3 and 4, may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof. Some of the functions and processing described herein may also be implemented with software executed on a processor. Certain aspects of the invention may also be implemented with a combination of software and hardware. For example, computation of the MAP metric, estimation of the signal amplitude V and noise variance $\sigma^2$, and other functions, may be performed based on program codes executed on a processor (which may also be used to implement MAP metric calculator 328 in FIG. 3).

Headings are included herein for reference and to aid in the locating certain sections. These heading are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of minimizing probability of error for decoding messages of unequal lengths and unequal a posteriori probability for blind transport format detection (BTFD), comprising:
receiving an incoming stream characterized by a preselected transport format;
computing a metric for each possible transport format of the incoming stream, including the preselected format; and
determining the preselected transport format based on a best one of the computed metrics,
wherein the metric is a function of:

$$\frac{\left(\sqrt{\alpha_s \hat{E}_s \alpha_p \hat{E}_p}\right)}{\beta(\alpha_s \hat{N}_t \alpha_p \hat{E}_p)} E_{VD}(n_c) - \frac{n_c \left(\sqrt{\alpha_s \hat{E}_s \alpha_p \hat{E}_p}\right)^2}{2\alpha_s \hat{N}_t \alpha_p \hat{E}_p} - n_m \ln(2),$$

where
$\alpha_s \hat{E}_s$ is an estimated energy of a signal component per symbol in the incoming stream,
$\alpha_p \hat{E}_p$ is an estimated energy of a pilot component per symbol in the incoming stream,
$\alpha_s \hat{N}_t$ is an estimated noise variance per symbol in the incoming stream,
$n_m$ is a length of a message corresponding to the transport format under consideration,
$n_c$ is a length of a codeword corresponding to the transport format under consideration, and
$E_{VD}(n_c)$ is an energy computed by a Viterbi decoder for a hypothesized codeword of length $n_c$.

2. The method of claim 1, wherein the BTFD is in a CDMA system.

3. The method of claim 2, wherein the CDMA system is a W-CDMA system.

4. A method for decoding messages in which at least one signaling characteristic of the messages is not known a priori, the method comprising:
receiving a sequence for a transmitted message;
computing a metric value for each of a plurality of hypothesized messages corresponding to a plurality of hypotheses for the at least one unknown signaling characteristic of the transmitted message, wherein the metric value is computed based on a metric derived to approximately maximize a joint a posteriori probability between the received sequence and the hypothesized messages; and
selecting a hypothesized message having a best metric value as the transmitted message,
wherein the metric is a function of:

$$\frac{\left(\sqrt{\alpha_s \hat{E}_s \alpha_p \hat{E}_p}\right)}{\beta(\alpha_s \hat{N}_t \alpha_p \hat{E}_p)} E_{VD}(n_c) - \frac{n_c \left(\sqrt{\alpha_s \hat{E}_s \alpha_p \hat{E}_p}\right)^2}{2\alpha_s \hat{N}_t \alpha_p \hat{E}_p} - n_m \ln(2),$$

where
$\alpha_s \hat{E}_s$ is an estimated energy of a signal component per symbol in the incoming stream,
$\alpha_p \hat{E}_p$ is an estimated energy of a pilot component per symbol in the incoming stream
$\alpha_s \hat{N}_t$ is an estimated noise variance per symbol in the incoming stream,
$n_m$ is a length of a message corresponding to the transport format under consideration,
$n_c$ is a length of a codeword corresponding to the transport format under consideration, and
$E_{VD}(n_c)$ is an energy computed by a Viterbi decoder for a hypothesized codeword of length $n_c$.

5. The method of claim 4, wherein the transport format identifies a particular length for the transmitted message selected from among a plurality of possible message lengths.

6. The method of claim 4, wherein the at least one unknown signaling characteristic further relates to a rate of the transmitted message.

7. The method of claim 6, wherein the transmitted message has a particular rate selected from among a plurality of possible rates.

8. The method of claim 7, wherein plurality of possible rates include full, half, quarter, and eight rates.

9. The method of claim 4, wherein the metric is derived based on a particular signaling scheme used to map the transmitted message to the sequence.

10. The method of claim 4, wherein the metric includes a first term indicative of an energy between the received sequence and a sequence corresponding to the hypothesized message being evaluated.

11. The method of claim 10, wherein the first term is derived by a Viterbi decoder used to decode for each hypothesized message.

12. The method of claim 10, wherein the metric includes a second term having a variable for each unknown signaling characteristic.

13. The method of claim 12, wherein the metric includes a second term having a variable for a length of a code sequence corresponding to the hypothesized message being evaluated.

14. The method of claim 12, wherein the metric includes a second term having a variable for a rate of the hypothesized message being evaluated.

15. The method of claim 12, wherein the metric includes a third term having a variable corresponding to a length of the hypothesized message being evaluated.

16. A method for decoding messages in which at least one signaling characteristic of the messages is not known a priori, the method comprising:
receiving a sequence for a transmitted message;
computing a metric value for each of a plurality of hypothesized messages corresponding to a plurality of hypotheses for the at least one unknown signaling characteristic of the transmitted message, wherein the metric value is computed based on a metric derived to approximately maximize a joint a posteriori probability between the received sequence and the hypothesized messages; and
selecting a hypothesized message having a best metric value as the transmitted message,
wherein the metric is expressed as:

$$\text{metric} = \left(\frac{1}{\sigma^2}\sum_{i=1}^{n_c} x_i y_i\right) - \left(\frac{n_c V^2}{2\sigma^2}\right) - n_m \ln(2),$$

where
m is the hypothesized message being evaluated,
y is the received sequence,
$n_m$ is a length of the hypothesized message being evaluated,
$n_c$ is a length of a codeword corresponding to the hypothesized message being evaluated,
V is a magnitude of a transmitted sequence corresponding to the received sequence, and
$\sigma^2$ is a variance of noise in a channel via which the received sequence was transmitted.

17. A method for decoding messages in which at least one signaling characteristic of the messages is not known a priori, the method comprising:
receiving a sequence for a transmitted message;
computing a metric value for each of a plurality of hypothesized messages corresponding to a plurality of hypotheses for the at least one unknown signaling characteristic of the transmitted message, wherein the metric value is computed based on a metric derived to approximately maximize a joint a posteriori probability between the received sequence and the hypothesized messages; and
selecting a hypothesized message having a best metric value as the transmitted message,
wherein the metric is expressed as:

$$\text{metric} = \left(\frac{1}{\sigma^2}\sum_{i=1}^{N_C} x_i y_i\right) - \left(\frac{N_C R V^2}{2\sigma^2}\right) - n_m \ln(2),$$

where
m is the hypothesized message being evaluated,
y is the received sequence,
$n_m$ is a length of the hypothesized message being evaluated,
$N_c$ is a length of a codeword corresponding to the hypothesized message being evaluated,
$\sqrt{RV}$ is a magnitude of a transmitted sequence corresponding to the received sequence, and
$\sigma^2$ is a variance of noise in a channel via which the received sequence was transmitted.

18. A method for decoding messages in which at least one signaling characteristic of the messages is not known a priori, the method comprising:
receiving a sequence for a transmitted message;
computing a metric value for each of a plurality of hypothesized messages corresponding to a plurality of hypotheses for the at least one unknown signaling characteristic of the transmitted message, wherein the metric value is computed based on a metric derived to approximately maximize a joint a posteriori probability between the received sequence and the hypothesized messages; and
selecting a hypothesized message having a best metric value as the transmitted message,
wherein the metric is expressed as:

$$\text{metric} = f_1(E_{VD}) - f_2(E_c) - f_3(n_m),$$

where
$E_{VD}$ is an energy related to a correlation between the received sequence and a sequence generated by re-encoding the hypothesized message being evaluated,
$E_c$ is an energy related to a transmitted sequence corresponding to the received sequence,
$n_m$ is a length of the hypothesized message being evaluated, and $f_1(\ )$, $f_2(\ )$, and $f_3(\ )$ represent functions of an argument within the parenthesis.

19. A method for decoding messages in which at least one signaling characteristic of the messages is not known a priori, the method comprising:
processing input samples to provide pilot symbols,
processing the input samples to provide data symbols,
coherently demodulating the data symbols with the pilot symbols to provide received sequence of symbols for a transmitted message;
computing a metric value for each of a plurality of hypothesized messages corresponding to a plurality of hypotheses for the at least one unknown signaling characteristic of the transmitted message, wherein the metric value is computed based on a metric derived to approximately maximize a joint a posteriori probability between the received sequence and the hypothesized messages; and
selecting a hypothesized message having a best metric value as a the transmitted message.

20. A method for decoding messages in which at least one signaling characteristic of the messages is not known a priori, the method comprising:
receiving a sequence for a transmitted message;
estimating signal amplitude of symbols in the received sequence;
estimating noise variance in the received sequence;
computing a metric value for each of a plurality of hypothesized messages corresponding to a plurality of hypotheses for the at least one unknown signaling characteristic of the transmitted message, wherein the metric value is computed based on a metric derived to approximately maximize a joint a posteriori probability between the received sequence and the hypothesized messages; and
selecting a hypothesized message having a best metric value as the transmitted message.

21. A receiver unit in a wireless communication system, comprising:
- a demodulator configured to receive and process input samples to derive a received sequence of symbols, and to further derive and provide a plurality of hypothesized sequences based on the received sequence and corresponding to a plurality of hypotheses for at least one unknown signaling characteristic of a transmitted message being recovered from the received sequence;
- a decoder coupled to the demodulator and configured to decode each hypothesized sequence to provide a corresponding decoded message; and
- a metric calculator operatively coupled to the demodulator and decoder and configured to compute a metric value for each hypothesized sequence, wherein the metric value is computed based on a metric derived to approximately maximize a joint a posteriori probability between the received sequence and the hypothesized sequences, and to further select a decoded message associated with a best metric value as the transmitted message,
- wherein the demodulator includes:
  - a pilot processor configured to receive and process the input samples to provide pilot symbols,
  - a data processor configured to receive and process the input samples to provide data symbols, and
  - a coherent demodulator coupled to the pilot and data processors and configured to coherently demodulate the data symbols with the pilot symbols to provide the received sequence of symbols.

22. The receiver unit of claim 21, wherein the decoder is a Viterbi decoder.

23. A receiver unit in a wireless communication system, comprising:
- a demodulator configured to receive and process input samples to derive a received sequence of symbols, and to further derive and provide a plurality of hypothesized sequences based on the received sequence and corresponding to a plurality of hypotheses for at least one unknown signaling characteristic of a transmitted message being recovered from the received sequence;
- a decoder coupled to the demodulator and configured to decode each hypothesized sequence to provide a corresponding decoded message; and
- a metric calculator operatively coupled to the demodulator and decoder and configured to compute a metric value for each hypothesized sequence, wherein the metric value is computed based on a metric derived to approximately maximize a joint a posteriori probability between the received sequence and the hypothesized sequences, and to further select a decoded message associated with a best metric value as the transmitted message,
- further comprising:
  - a signal and noise estimator coupled to the demodulator and configured to estimate signal amplitude of symbols in a transmitted sequence corresponding to the received sequence and to further estimate noise variance in the received sequence.

24. An apparatus for decoding messages in which at least one signaling characteristic of the messages is not known a priori, comprising:
- a processor adapted to process input samples to provide pilot symbols,
- a processor adapted to process the input samples to provide data symbols,
- a demodulator adapted to coherently demodulate the data symbols with the pilot symbols to provide received sequence of symbols for a transmitted message;
- a metric calculator adapted to compute a metric value for each of a plurality of hypothesized messages corresponding to a plurality of hypotheses for the at least one unknown signaling characteristic of the transmitted message, wherein the metric value is computed based on a metric derived to approximately maximize a joint a posteriori probability between the received sequence and the hypothesized messages; and
- a processor adapted to select a hypothesized message having a best metric value as a the transmitted message.

25. An apparatus for decoding messages in which at least one signaling characteristic of the messages is not known a priori, comprising:
- means for processing input samples to provide pilot symbols,
- means for processing the input samples to provide data symbols,
- means for coherently demodulating the data symbols with the pilot symbols to provide received sequence of symbols for a transmitted message;
- means for computing a metric value for each of a plurality of hypothesized messages corresponding to a plurality of hypotheses for the at least one unknown signaling characteristic of the transmitted message, wherein the metric value is computed based on a metric derived to approximately maximize a joint a posteriori probability between the received sequence and the hypothesized messages; and
- means for selecting a hypothesized message having a best metric value as a the transmitted message.

26. A computer program product for decoding messages in which at least one signaling characteristic of the messages is not known a priori, comprising:
- non-transitory computer-readable medium, comprising codes for casing a computer to:
- process input samples to provide pilot symbols,
- process the input samples to provide data symbols,
- coherently demodulate the data symbols with the pilot symbols to provide received sequence of symbols for a transmitted message;
- compute a metric value for each of a plurality of hypothesized messages corresponding to a plurality of hypotheses for the at least one unknown signaling characteristic of the transmitted message, wherein the metric value is computed based on a metric derived to approximately maximize a joint a posteriori probability between the received sequence and the hypothesized messages; and
- select a hypothesized message having a best metric value as a the transmitted message.

27. An apparatus for decoding messages in which at least one signaling characteristic of the messages is not known a priori, comprising:
- a receiver that receives a sequence for a transmitted message;
- a signal estimator that estimates signal amplitude of symbols in the received sequence;
- a noise estimator that estimates noise variance in the received sequence;
- a metric calculator that computes a metric value for each of a plurality of hypothesized messages corresponding to a plurality of hypotheses for the at least one unknown signaling characteristic of the transmitted message, wherein the metric value is computed based on a metric derived to approximately maximize a joint a posteriori probability between the received sequence and the hypothesized messages; and a processor that selects a hypothesized message having a best metric value as the transmitted message.

28. An apparatus for decoding messages in which at least one signaling characteristic of the messages is not known a priori, comprising:
  means for receiving a sequence for a transmitted message;
  means for estimating signal amplitude of symbols in the received sequence;
  means for estimating noise variance in the received sequence;
  means for computing a metric value for each of a plurality of hypothesized messages corresponding to a plurality of hypotheses for the at least one unknown signaling characteristic of the transmitted message, wherein the metric value is computed based on a metric derived to approximately maximize a joint a posteriori probability between the received sequence and the hypothesized messages; and
  means for selecting a hypothesized message having a best metric value as the transmitted message.

29. A computer program product for decoding messages in which at least one signaling characteristic of the messages is not known a priori, comprising:
  non-transitory computer-readable medium, comprising codes for casing a computer to:
  receive a sequence for a transmitted message;
  estimate signal amplitude of symbols in the received sequence;
  estimate noise variance in the received sequence;
  compute a metric value for each of a plurality of hypothesized messages corresponding to a plurality of hypotheses for the at least one unknown signaling characteristic of the transmitted message, wherein the metric value is computed based on a metric derived to approximately maximize a joint a posteriori probability between the received sequence and the hypothesized messages; and
  select a hypothesized message having a best metric value as the transmitted message.

\* \* \* \* \*

UNITED STATES PATENT AND TRADEMARK OFFICE
CERTIFICATE OF CORRECTION

| | |
|---|---|
| PATENT NO. | : 8,014,473 B2 |
| APPLICATION NO. | : 09/834135 |
| DATED | : September 6, 2011 |
| INVENTOR(S) | : Richard Chi |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
Nineteenth Day of November, 2013

Teresa Stanek Rea
*Deputy Director of the United States Patent and Trademark Office*